United States Patent [19]

Miyamoto et al.

[11] 4,326,797

[45] Apr. 27, 1982

[54] COPYING APPARATUS CAPABLE OF CHANGING OVER THE COPYING MODE AND THE COPYING MAGNIFICATION

[75] Inventors: Koichi Miyamoto, Tokyo; Yasuhito Kan, Urawa; Hiroshi Nitanda, Tokyo; Masao Ariga, Yokohama, all of Japan

[73] Assignee: Canon Kabushiki Kaisha, Tokyo, Japan

[21] Appl. No.: 170,659

[22] Filed: Jul. 21, 1980

[30] Foreign Application Priority Data

Jul. 27, 1979 [JP] Japan .................................. 54-95658

[51] Int. Cl.³ .................... G03B 27/34; G03B 27/70
[52] U.S. Cl. .................................... 355/57; 355/60; 355/8; 355/11
[58] Field of Search ................ 355/8, 57, 60, 11, 51

[56] References Cited

U.S. PATENT DOCUMENTS

| | | | |
|---|---|---|---|
| 3,609,024 | 9/1971 | Suzuki | 355/60 X |
| 4,110,030 | 8/1978 | Knechtel | 355/57 X |
| 4,154,524 | 5/1979 | Hattari et al. | 355/57 |
| 4,158,497 | 6/1979 | Suzuki et al. | 355/57 X |

Primary Examiner—L. T. Hix
Assistant Examiner—W. J. Brady
Attorney, Agent, or Firm—Fitzpatrick, Cella, Harper & Scinto

[57] ABSTRACT

In a copying apparatus, a mode change-over mirror is selectively displaced between its retracted position and its operative position, whereby the copying mode is selectively changed over to a first mode and a second mode. The operative position is set at at least two places. When the mode change-over mirror lies at a first operative position, second mode copying at a first magnification is effected and when the mode change-over mirror lies at a second operative position, second mode copying at a second magnification is effected.

15 Claims, 2 Drawing Figures

COPYING APPARATUS CAPABLE OF CHANGING OVER THE COPYING MODE AND THE COPYING MAGNIFICATION

BACKGROUND OF THE INVENTION

1. Field of the Invention

This invention relates to a copying apparatus in which both the copying mode and the copying magnification can be changed over. The copying mode refers to a copying style in which an original supporting table capable of supporting thereon a three-dimensional original such as a book is used and the original on this table is scanned by a scanning optical system to obtain a copy, or a copying style in which a thin sheet-like original is moved by a sheet conveying device such as rollers, whereby the original is scanned to obtain a copy, and for the sake of simplicity, the former is referred to as the book mode copying and the latter is referred to as the sheet mode copying.

2. Description of the Prior Art

An example of the copying apparatus as described above is disclosed in Japanese Laid-open patent application No. 48323/1977. The apparatus described in this publication is such that during the book mode copying, an original resting on an original supporting table is scanned by two reciprocally movable mirrors and during the sheet mode copying, said two mirrors are stopped below one end of the original supporting table while, on the other hand, a sheet conveying device is installed at said one end of the original supporting table and the image of a sheet original conveyed by the conveying device is projected upon a photosensitive medium through the agency of said two mirrors. During reduction copying, irrespective of the book mode copying or the sheet mode copying, a mirror for extending the length of the optical path is inserted behind said two mirrors. The disadvantages of the apparatus of this publication are that since the auxiliary mirror is used during reduction copying as described above, a loss of quantity of light is caused by that mirror, that since part of the original supporting table must also be used during the sheet mode copying as described above, conveyance of the original is liable to become unstable and that as described above, the original conveying device must be moved in accordance with the change-over of the copying mode and this results in complication of the construction and cumbersomeness of the operation.

Another example of the apparatus is disclosed in Japanese Laid-open patent application No. 31746/1977. In the apparatus of this publication, the book mode copying is effected by scanning the original on the original supporting table by two reciprocally movable mirrors and the sheet mode copying is effected by conveying an original through a window portion provided at a predetermined position to which said two scanning mirrors are not opposed, and at this time, a second one of said two mirrors is turned by a predetermined angle so as to be retracted out of the optical path between said window portion and a lens. When the copying magnification is changed, the lens is displaced in a direction along the optical axis. This apparatus has not the disadvantages peculiar to the first-mentioned known apparatus, but a complex mechanism is necessary to cause the mirror reciprocated for the scanning of the original on the original supporting table to be turned at a predetermined position for the sheet mode copying and in addition, such mechanism is weak and low in accuracy.

SUMMARY OF THE INVENTION

It is an object of the present invention to provide a copying apparatus in which both the copying mode and the copying magnification can be changed over and which is simple in construction.

It is another object of the present invention to provide a copying apparatus which can produce good copy images during any mode of copying and during copying at any magnification.

Other objects and features of the present invention will become apparent from the following detailed description taken in conjunction with the accompanying drawings.

DESCRIPTION OF THE PREFERRED EMBODIMENTS

Figure 1:
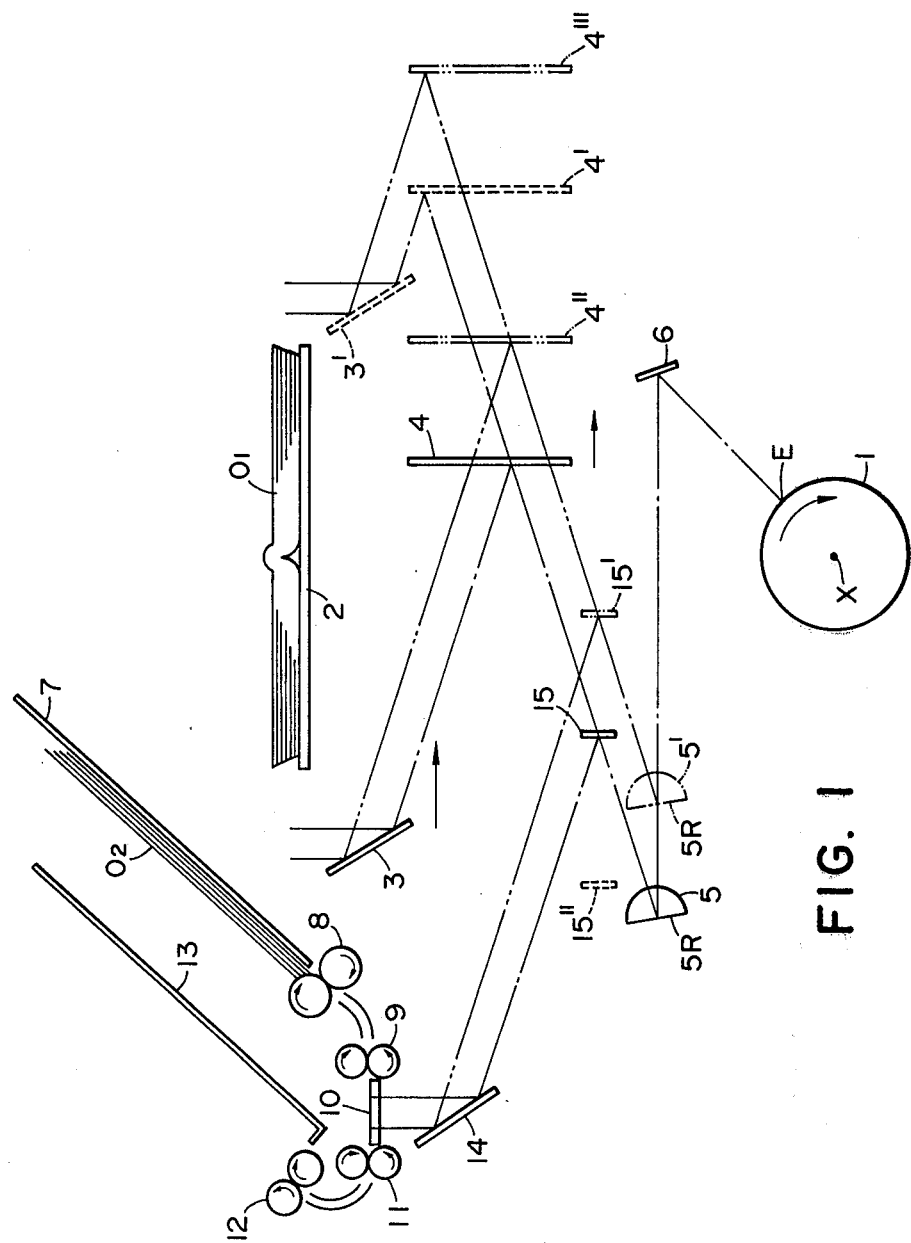
FIG. 1 illustrates an embodiment of the present invention.

In FIG. 1, reference numeral 1 designates a drum-shaped electrophotographic photosensitive medium which is rotatable in the direction of arrow. At a position E, an optical image of an original at a selected magnification is projected upon the drum 1 by an optical system which will hereinafter be described, whereby an electrostatic image is formed on the drum. This electrostatic image is developed into a visible toner image. This visible toner image is transferred from the drum to paper. Thereafter, the paper is transported to a fixing device, by which the image is fixed on the paper. The well-known electrophotographic process is arbitrarily applicable as such an image formation process. In this embodiment, the drum 1 is rotated at a predetermined peripheral velocity V for any copying magnification selected. However, design may be made such that the drum is rotated at a different peripheral velocity for a different magnification.

Designated by 2 is a transparent original supporting table on which a three-dimensional original 01 such as a book may rest. This table 2 is fixed to an immovable member of the copying apparatus body. The original 01 on the table 2 is scanned by mirrors 3 and 4. That is, the mirrors 3 and 4 are reciprocally moved parallel to the table 2 at a velocity ratio of $1:\frac{1}{2}$, and scan the original 01 during their forward movement. During one-to-one magnification copying, the mirror 3 is moved forward at a velocity V equal to the peripheral velocity of the photosensitive medium 1, and during m (for example, $m<1$) magnification copying, the mirror 3 is moved forward at a velocity $V/m$. During one-to-one magnification copying, the mirror 4 is moved forward from its solid-line position to its broken-line position 4'. On the other hand, during m magnification copying, the mirror 4 is first parallel-displaced from the solid-line position to a position 4" before said forward movement is started, in order to correct the length of the optical path for the formation of m magnification image of the original. That is, the forward movement starting point of the mirror 4 is displaced to the dots-and-dash line position 4"', from which position the mirror is moved forward to a position 4"'. On the other hand, the mirror 3 is only moved forward from its solid-line position to its broken-line position 3' both during one-to-one magnification copying and during m magnification copying. In any case, when the mirrors 3 and 4 are at their forward movement starting positions, these two mirrors are not opposed to the original 01, but only when the mirrors have been moved forward by predetermined distances, the mirrors 3 and 4 become opposed to the original and start to scan the same, or in other words, the photosensitive medium 1 begins to be slit-exposed to the optical image of the original 01. Said predetermined distances are the so-called preparatory running distances and during the time that the mirrors run over these distances, the vibration of the mirrors 3 and 4 occurring during their start is eliminated. After having scanned the original 01, the mirrors 3 and 4 are moved backward from said forward movement termini to said forward movement starting points.

The image of the original 01 scanned by the forward movement of the mirrors 3 and 4 is projected upon the photosensitive medium through an in-mirror lens 5 and a mirror 6 fixed to an immovable member of the copying apparatus body. The in-mirror lens 5 having a reflecting surface 5R is located at its solid-line position during one-to-one magnification copying, and is displaced to its dots-and-dash line position 5', during m magnification copying, prior to the start of the original scanning, in order to correct the length of the optical path for the forming of m magnification image of the original. When the magnification is changed from m magnification to one-to-one magnification, the lens is returned from the position 5' to the position 5. Of course, during the original scanning, the lens 5 is stopped at a position corresponding to the selected magnification. In the present embodiment, it should be understood that the direction of displacement of the lens 5 is parallel to the original supporting table 2. However, said direction for displacement may alternatively be inclined with respect to the table 2. But it is preferable that the lens 5 be guided so as to be displaced parallel to a plane containing the principal ray path (dot-and-dash line) in the optical path between the lens 5 and the mirror 6 and parallel to the rotational axis X of the drum 1. This is because the direction of incidence of the imaging light beam onto the drum 1 is the same irrespective of the displacement of the lens 5. In the present embodiment, said plane is parallel to the table 2. Of course, the direction of displacement of the lens 5 may be determined as desired.

What has been described above is the scanning and projecting system for the original 01 during the book mode copying. During the sheet mode copying, use is made of an original conveying device which will hereinafter be described. That is, reference numeral 7 designate a sheet original supply bed on which sheet originals 02 may be piled. The sheet originals 02 are fed one by one from the bed 7 by a pair of rollers 9 and moved on a transparent glass window 10. The velocity of this movement is V during one-to-one magnification copying, and V/m during m magnification copying. The sheet original 02 which has been moved on the window 10 is discharged onto a discharge tray 13 by pairs of rollers 11 and 12.

The sheet original 02 is scanned when it is being moved on the window 10, that is, the photosensitive medium 1 is slit-exposed to the optical image of the original 02. Designated by 15 is a mode change-over mirror. The mirror 15, during the book mode copying, is retracted to a position 15" outside the imaging light beam path between the mirrors 3, 4 and the lens 5. However, when the mode is changed over from the book mode copying to the sheet mode copying, the mirror 15 is moved from the position 15" into said light path prior to the start of the original scanning and closes the book mode imaging light beam path and opens the sheet mode imaging light beam path. That is, during the sheet mode copying, the mirror 15 lies at a position whereat the imaging light beam path from the window 10 and the imaging light beam path from the original supporting table 2 through the mirrors 3, 4 meet each other. The light path subsequent to said meeting position and passing through the lens 5 to the photosensitive medium 1 by way of the mirror 6 is used in common for the book mode and the sheet mode copying. The mirror 15 reflects toward the lens 5 the light beam from the sheet original 02 moved on the window 10 which has been reflected by a mirror 14 fixed to an immovable member of the copying apparatus body. The lens 5 forms an optical image of the sheet original 02 at the selected magnification and the photosensitive medium 1 is slit-exposed to such optical image via the mirror 6. In the sheet mode copying as well as in the book mode copying, the lens 5 lies at its solid-line position during one-to-one magnification copying, and is displaced to its dots-and-dash line position 5' during m magnification copying prior to the start of the original scanning. The mode change-over mirror 15 lies at its solid-line position during one-to-one magnification copying, and is displaced to its dots-and-dash line position 15' during m magnification copying prior to the start of the original scanning. Of course, the displacement of the mirror 15 between the positions 15 and 15' is for correcting the length of the optical path correspondingly to the selected magnification. The length of the optical path between the mirror 15 at its solid-line position and the window 10 is set so as to be equal to the length of the optical path between this position 15 and the original supporting table 2 via the mirrors 4, 3 having the mutual relation during one-to-one magnification copying, and the length of the optical path between the dots-and-dash line position 15' and the window 10 is set so as to be equal to the length of the optical path between this position 15' and the original supporting table 2 via the mirrors 4, 3 having the mutual relation during m magnification copying. In short, the mode change-over mirror 15 serves also as an optical member for changing over the length of the optical path. Of course, during the original scanning, the mirror 15 is stopped at a position corresponding to the selected magnification.

Figure 2:
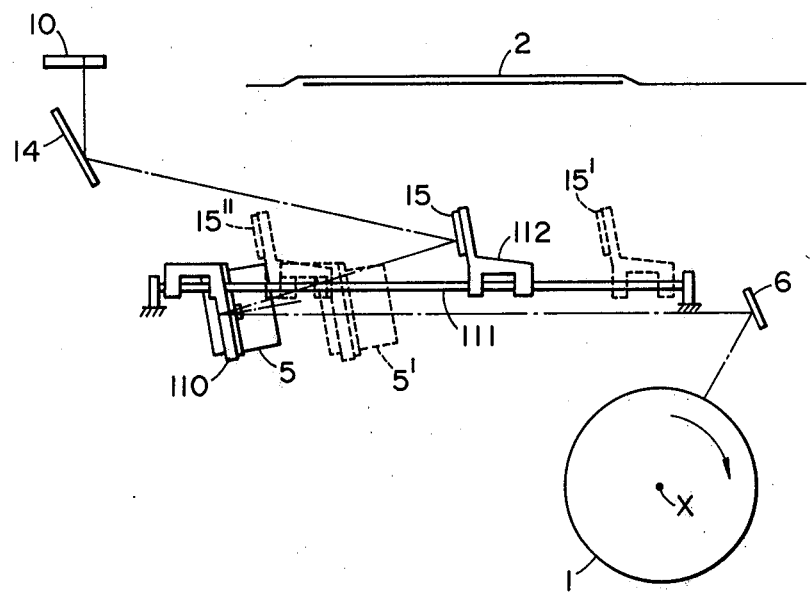
FIG. 2 illustrates a device for guiding a mode change-over mirror and a lens.

It is preferable that the mirror 15 be displaced between said three positions by being parallel-moved along a straight line and that the displacement of the mirror 15 be parallel to the direction of displacement of the lens 5. This is because, as shown in FIG. 2, the mirror 15 and the lens 5 can be supported and guided by a single guide member. That is, in FIG. 2, the lens 5 is mounted on a lens mount 110. The lens mount 110 is slidably supported on a guide rail 111. Also, the movable mode change-over mirror 15 is mounted on a mirror mount 112, which is also slidably supported on the guide rail 111. The lens mount 110 and the mirror 112 are so configured and disposed as not to mechanically interfere with each other on the guide rail 111 even when they assume said positions. In an embodiment wherein the lens 5 is displaced parallel to the original supporting table 2, the rail 111 is fixed parallel to the original supporting table 2.

During the sheet mode copying, the mirrors 3 and 4 remain stopped at said forward movement starting points. During the book mode copying, the mirror 15 remains retracted to its position 15" and said pairs of rollers also remain stopped.

Thus, according to the present invention, the above-noted disadvantages peculiar to the prior art can be eliminated, and both the sheet mode copying and the book mode copying and also the copying at a changed magnification in the respective modes can be accomplished with ease. Also, the construction of the optical system is simple and the accuracy thereof is high and thus, good copy images can be produced.

What we claim is:

1. A copying apparatus having changeable copying modes and copying magnifications, comprising:
    an original supporting table for supporting a three-dimensional original thereon;
    a window located away from said original supporting table;
    sheet original conveying means for conveying a sheet original past said window;
    imaging means for forming an image of an original supported on said original supporting table or a sheet original conveyed past said window on a photosensitive medium at a selected magnification;
    a first optical system for scanning, in a first copy mode, an original supported on said original supporting table and directing a beam from the original to said imaging means; and
    a second optical system for directing, in a second copy mode, the beam from the original conveyed by said conveying means, to the imaging means through said window, said second optical system including a mode-changing mirror which is movable to a retracted position, in the first copy mode, such that it is retracted out of the optical path for the sheet original conveyed by said sheet original conveying means, and which is movable, in the second mode, to one of a plurality of stationary operating positions, in accordance with the selected magnification, such that the beam from the sheet original conveyed by said sheet original conveying means is positioned in the optical path for the sheet orignal conveyed by said sheet original conveying means.

2. An apparatus according to claim 1, wherein during a change of the copying magnification, said imaging means is displaced in a direction parallel to the direction of displacement of said mirror.

3. An apparatus according to claim 2, wherein said mirror and said imaging means are guided by a common guide means.

4. An apparatus according to claim 1, 2 or 3, wherein said mirror is moved rectilinearly.

5. An apparatus according to claim 1, 2 or 3, wherein said mirror is displaced parallel to said original supporting table.

6. An apparatus according to claim 1, 2 or 3, wherein said first optical system includes first and second mirrors which are movable in a direction parallel to said original supporting table at different speeds.

7. An apparatus according to claim 6, wherein the relative position between said first and second mirrors is changed in accordance with the copy magnification selected.

8. A copying apparatus having changeable copying modes and copying magnifications, comprising:
    first original supporting means for supporting an original to be copied in a first mode;
    second original supporting means for supporting an original to be copied in a second mode;
    first, second and third optical means;
    said first and third optical means, in the first mode, cooperating with each other to project an image of an original supported by said first original supporting means onto a photosensitive member of said apparatus;
    said second and third optical means, in the second mode, cooperating with each other to project an image of an original supported by said second original supporting means onto said photosensitive member, wherein at least in the second mode, the copy magnification is changeable;
    said second optical means including mode-change reflecting means which is movable, in the first mode, to a retracted position wherein the beam from the original supported on said first original supporting means travels through said first optical means toward said third optical means, and wherein the cooperation between said second optical means and said third optical means is released, and which is selectively movable, in the second mode, to a plurality of stationary operating positions, in response to selected magnifications, respectively, such that it blocks the optical path between said first optical means and said third optical means, and reflect the beam from said second original support toward said third optical means.

9. An apparatus according to claim 8, wherein said third optical means includes an imaging lens which moves, in accordance with a magnification change, in the direction parallel to the displacement of said mode-change reflecting means.

10. An apparatus according to claim 9, wherein said mode-change reflecting means and said lens are guided by a common guide.

11. An apparatus according to claim 8, 9 or 10, wherein one of said first and second original support means includes an original supporting table for supporting thereon a book original, and the other includes a window by which a sheet original passes and wherein that one of said first and second optical means which is opposed to said original supporting table includes reciprocable first and second scanning reflective means which are disposed optically between said operating positions and said original supporting table, and which are movable at different speeds.

12. An apparatus according to claim 11, wherein a starting position of the reciprocable movement of one of said reciprocable reflective means is variable to change the copy magnification when an original supported on said supporting table is to be copied.

13. An apparatus according to claim 8, 9 or 10, wherein said first and second optical means have the same number of mirrors.

14. An apparatus according to claim 11, wherein said first and second optical means have the same number of mirrors.

15. An apparatus according to claim 12, wherein said first and second optical means have the same number of mirrors.

* * * * *

UNITED STATES PATENT AND TRADEMARK OFFICE
CERTIFICATE OF CORRECTION

PATENT NO. : 4,326,797

DATED : April 27, 1982

INVENTOR(S) : KOICHI MITAMOTO, ET AL.

It is certified that error appears in the above-identified patent and that said Letters Patent is hereby corrected as shown below:

Column 1, line 65, "perculiar" should read --peculiar--.

Column 3, line 28, "forming" should read --formation--.

Column 6, line 32, "reflect" should read --reflects--.

Signed and Sealed this

Twenty-first Day of September 1982

[SEAL]

Attest:

GERALD J. MOSSINGHOFF

Attesting Officer

Commissioner of Patents and Trademarks